United States Patent
Yoshiura

(10) Patent No.: US 11,840,300 B2
(45) Date of Patent: Dec. 12, 2023

(54) VEHICLE BODY COVER AND SADDLE-TYPE VEHICLE

(71) Applicant: SUZUKI MOTOR CORPORATION, Hamamatsu (JP)

(72) Inventor: Toshiaki Yoshiura, Hamamatsu (JP)

(73) Assignee: SUZUKI MOTOR CORPORATION, Hamamatsu (JP)

(*) Notice: Subject to any disclaimer, the term of this patent is extended or adjusted under 35 U.S.C. 154(b) by 872 days.

(21) Appl. No.: 16/566,103

(22) Filed: Sep. 10, 2019

(65) Prior Publication Data

US 2020/0094901 A1   Mar. 26, 2020

(30) Foreign Application Priority Data

Sep. 21, 2018 (JP) .................................. 2018-177028

(51) Int. Cl.
| | | |
|---|---|---|
| *B62J 17/00* | (2020.01) | |
| *B62J 17/02* | (2006.01) | |
| *B62J 99/00* | (2020.01) | |
| *B62J 45/00* | (2020.01) | |

(52) U.S. Cl.
CPC ............. *B62J 17/02* (2013.01); *B62J 99/00* (2013.01); *B62J 45/00* (2020.02)

(58) Field of Classification Search
CPC ............. B62J 17/02; B62J 99/00; B62J 45/00
See application file for complete search history.

(56) References Cited

U.S. PATENT DOCUMENTS

| 2005/0225057 A1* | 10/2005 | Yamamoto .......... B60R 11/0264 |
| | | 280/727 |
| 2008/0202835 A1 | 8/2008 | Suita et al. ................... 180/219 |
| 2012/0228895 A1 | 9/2012 | Ochiai et al. ................. 296/78.1 |

FOREIGN PATENT DOCUMENTS

| CN | 101712356 A | | 5/2010 |
|---|---|---|---|
| CN | 103359228 A | | 10/2013 |
| CN | 103395460 B | * | 3/2016 |
| DE | 42 17 267 A1 | | 11/1993 |
| EP | 2 168 850 A1 | | 9/2009 |
| EP | 2168850 A1 | | 3/2010 |
| EP | 2 497 687 A1 | | 2/2012 |
| EP | 2 554 464 A2 | | 5/2012 |
| EP | 2 610 113 A1 | | 10/2012 |
| JP | S 58-178087 U | | 11/1983 |
| JP | 59-81682 U | | 6/1984 |
| JP | 2010-83358 A | | 4/2010 |

(Continued)

OTHER PUBLICATIONS

German Office Action dated Aug. 17, 2021, issued by the German Patent and Trademark Office in corresponding application DE 102019006260.4.

(Continued)

*Primary Examiner* — Adam M Alharbi
(74) *Attorney, Agent, or Firm* — Stein IP, LLC

(57) ABSTRACT

There is provided a vehicle body cover that covers front, left, and right sides of a front upper portion of a saddle-type vehicle. A front cover covers the front side of the front upper portion. A pair of side covers respectively cover the left side and the right side of the front upper portion. An inward surface of at least one of the pair of side covers in a vehicle width direction is provided with a harness insertion groove. A wire harness is inserted and positioned in the wire harness groove.

13 Claims, 9 Drawing Sheets

(56) References Cited

FOREIGN PATENT DOCUMENTS

| JP | 2012-187947 A | 10/2012 |
|----|---------------|---------|
| JP | 2013-35305 A  | 2/2013  |
| JP | 2013-136306 A | 7/2013  |
| JP | 2017-177888 A | 10/2017 |

OTHER PUBLICATIONS

Indian Office Action dated Mar. 8, 2021, issued to Indian Application No. 201914037259.
Japanese Office Action dated Apr. 26, 2022, issued to Japanese Application No. 2018-177028.
Japanese Office Action dated Oct. 4, 2022, issued by the Japanese Patent Office in corresponding application JP 2018-177028.
Indian Office Action dated Sep. 13, 2023, issued by the Indian Patent Office in corresponding application IN 201914037259.

* cited by examiner

VEHICLE BODY COVER AND SADDLE-TYPE VEHICLE

CROSS-REFERENCE TO RELATED APPLICATIONS

The disclosure of Japanese Patent Application No. 2018-177028 filed on Sep. 21, 2018, including specification, drawings and claims is incorporated herein by reference in its entirety.

TECHNICAL FIELD

The present disclosure relates to a vehicle body cover of a saddle-type vehicle and a saddle-type vehicle.

BACKGROUND

A saddle-type vehicle is provided with a wire harness that respectively connects a meter, a headlight, and the like provided at a front upper portion of the saddle-type vehicle to a battery, a sensor, and an engine control unit (ECU) provided at a central portion in the front-rear direction or a rear portion of the saddle-type vehicle. Such a wire harness is often routed to pass between an engine and a fuel tank and reach the meter or the headlight through a side of a head pipe (see Patent Document 1).

Japanese Utility Model Application Publication No. S58-178087 U

In recent years, the number of wires connected to a meter has been increasing with advanced multi-functionalization of meters, for example, and an outer diameter of a wire harness that bundles these wires tends to increase. For this reason, it is difficult to improve an appearance of a saddle-type vehicle by hiding a wire harness that bundles wires for connection with a meter or the like from a driver seated on a seat or a person around the saddle-type vehicle.

In this regard, a saddle-type vehicle including a vehicle body cover such as a half cowl or a full cowl can make it possible to hide the wire harness by completely enclosing the wire harness with the vehicle body cover inside which the wire harness passes through. In this case, however, the wire harness is difficult to assemble during manufacture of the saddle-type vehicle, which may deteriorate workability of manufacture. The wire harness is also difficult to attach and detach during maintenance of the saddle-type vehicle, which may deteriorate workability of maintenance.

SUMMARY

It is at least one of objects of the present disclosure to provide a vehicle body cover, which can improve an appearance of a saddle-type vehicle by hiding a wire harness including wires connected to an electric device such as a meter provided at a front upper portion of the saddle-type vehicle and improve attachment and detachment properties of the wire harness with respect to the saddle-type vehicle, as well as a saddle-type vehicle.

According to an aspect of the embodiments of the present disclosure, there is provided a vehicle body cover that covers front, left, and right sides of a front upper portion of a saddle-type vehicle. The vehicle body cover includes: a front cover that covers the front side of the front upper portion of the saddle-type vehicle; and a pair of side covers that respectively cover the left side and the right side of the front upper portion of the saddle-type vehicle. An inward surface of at least one of the pair of side covers in a vehicle width direction is provided with a harness insertion groove for inserting therein and positioning a wire harness including wires connected to an electric device including a meter unit provided at the front upper portion of the saddle-type vehicle.

According to another aspect of the embodiments of the present disclosure, there is provided a saddle-type vehicle including: a vehicle body cover that covers front, left, and right sides of a front upper portion of the saddle-type vehicle; an electric device including a meter unit provided at the front upper portion of the saddle-type vehicle; and a wire harness including wires connected to the electric device. The vehicle body cover includes: a front cover that covers the front side of the front upper portion of the saddle-type vehicle; and a pair of side covers that respectively cover the left side and the right side of the front upper portion of the saddle-type vehicle. An inward surface of at least one of the pair of side covers in a vehicle width direction is provided with a harness insertion groove. The wire harness is inserted and positioned in the harness insertion groove.

With the above configurations, it is possible to improve the appearance of the saddle-type vehicle by hiding the wire harness including wires connected to an electric device such as a meter provided at a front upper portion of the saddle-type vehicle, and improve attachment and detachment properties of the wire harness with respect to the saddle-type vehicle.

DETAILED DESCRIPTION OF THE EMBODIMENTS

Figure 1:
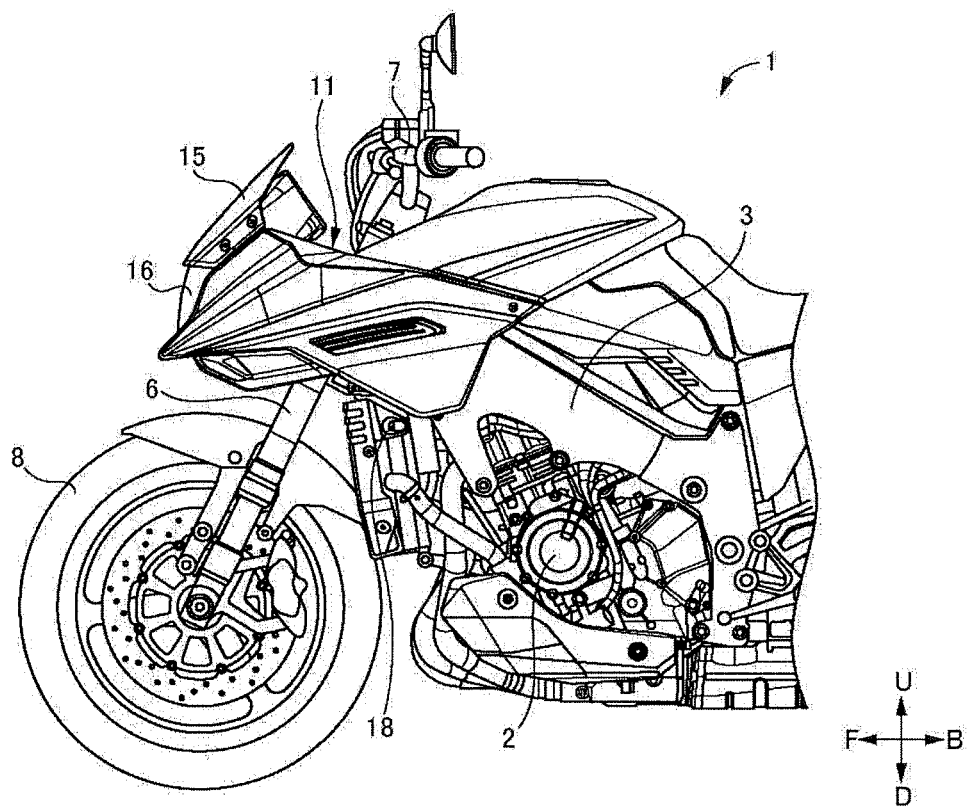
FIG. 1 is a left view of a front portion of a saddle-type vehicle including a vehicle body cover according to an embodiment of the present disclosure.

A vehicle body cover according to an embodiment of the present disclosure covers front, left, and right sides of a front upper portion of a saddle-type vehicle. The vehicle body cover includes a front cover that covers the front side of the front upper portion of the saddle-type vehicle, and a pair of side covers that respectively covers the left side and the right side of the front upper portion of the saddle-type vehicle. The front upper portion of the saddle-type vehicle is provided with an electric device including a meter unit, as well as a harness insertion groove to insert and position a wire harness including wires connected to the electric device on an inward surface of at least one of the pair of side covers in the vehicle width direction. That is, the harness insertion groove is provided on one or both of a right surface of the side cover that covers the left side of the front upper portion of the saddle-type vehicle and a left surface of the side cover that covers the right side of the front upper portion of the saddle-type vehicle.

The wire harness is inserted into the harness insertion groove. Accordingly, the wire harness is disposed along the harness insertion groove. That is, the wire harness is positioned to extend in the same direction with the harness insertion groove. In this manner, the harness insertion groove has a function of routing the wire harness toward the electric device in an orderly manner.

By being inserted into the harness insertion groove in a left side panel, the wire harness is hidden and invisible to the left side panel when the saddle-type vehicle is viewed from left. Similarly, by being inserted into the harness insertion groove in a right side panel, the wire harness is hidden and invisible to the right side panel when the saddle-type vehicle is viewed from right. Therefore, the wire harness can be hidden from a person around the saddle-type vehicle and an appearance of the saddle-type vehicle can be improved.

The harness insertion groove has a shape recessed outward in the vehicle width direction from an inward surface of a side panel. Therefore, by being inserted into the harness insertion groove, all or a part of the wire harness is hidden and invisible to the harness insertion groove when the saddle-type vehicle is viewed from above. Accordingly, all or a part of the wire harness can be hidden from a driver seated on a seat of the saddle-type vehicle and the appearance of the saddle-type vehicle can be improved.

The harness insertion groove is opened inward in the vehicle width direction from an inward surface of a side panel. Therefore, the wire harness can be inserted into the harness insertion groove by being inserted between a head pipe or a front fork and the side panel during manufacture of the saddle-type vehicle. Further, the wire harness can be detached from the harness insertion groove by inserting a hand between the head pipe or the front fork and the side panel during maintenance of the saddle-type vehicle. In this manner, the wire harness can be easily attached to and detached from the saddle-type vehicle without detaching the vehicle body cover from the saddle-type vehicle or disassembling the vehicle body cover. Accordingly, workability during manufacture or maintenance of the saddle-type vehicle can be improved.

A saddle-type vehicle according to an embodiment of the present disclosure includes a vehicle body cover that covers front, left, and right sides of a front upper portion of the saddle-type vehicle, an electric device including a meter unit provided at the front upper portion of the saddle-type vehicle, and a wire harness including wires connected to the electric device. The vehicle body cover includes a front cover that covers the front side of the front upper portion of the saddle-type vehicle, and a pair of side covers that respectively covers the left side and the right side of the front upper portion of the saddle-type vehicle. A harness insertion groove is provided on an inward surface of at least one of the pair of side covers in the vehicle width direction; the wire harness is inserted and positioned into the harness insertion groove.

According to the saddle-type vehicle having such a configuration, the wire harness can be hidden from a person around the saddle-type vehicle; all or a part of the wire harness can be hidden from a driver seated on a seat of the saddle-type vehicle; and an appearance of the saddle-type vehicle can be improved. Further, the harness insertion groove is opened inward from an inward surface of a side panel in the vehicle width direction. Accordingly, the wire harness can be easily attached to and detached from the saddle-type vehicle without detaching the vehicle body cover from the saddle-type vehicle or disassembling the vehicle body cover. Therefore, workability at during manufacture or maintenance of the saddle-type vehicle can be improved.

Embodiment

An embodiment of the present disclosure will be described below with reference to drawings. For convenience of description, directions of front (F), rear (B), left (L), right (R), upper (U), and lower (D) described relative to configurations or operation of a vehicle body cover and a saddle-type vehicle according to the embodiment follow arrows drawn at lower right in FIGS. 1 to 7 and 10 to 12.

Saddle-Type Vehicle

Figure 2:
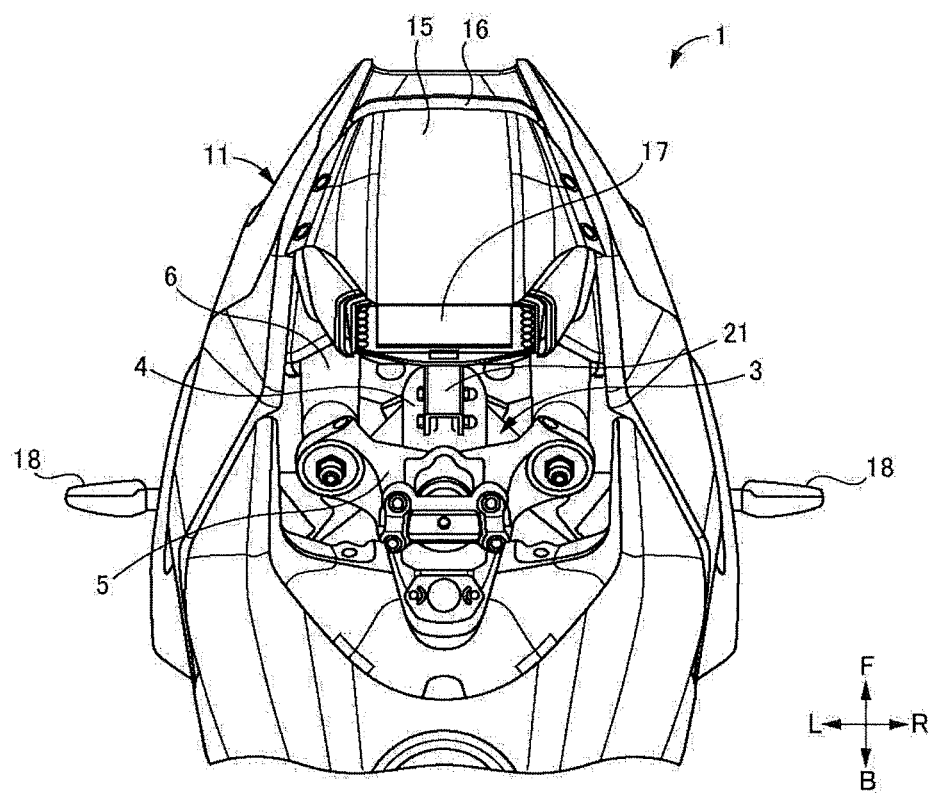
FIG. 2 is a top view of the front portion of the saddle-type vehicle including the vehicle body cover according to the embodiment of the present disclosure.

FIG. 1 illustrates a front portion of a saddle-type vehicle 1 according to the embodiment of the present disclosure as viewed from left. FIG. 2 illustrates the front portion of the saddle-type vehicle 1 as viewed from above. A handle and a front wheel are omitted in FIG. 2. As illustrated in FIGS. 1 and 2, the saddle-type vehicle 1 is a motorcycle including a gasoline engine 2 as a power source. The saddle-type vehicle 1 includes a vehicle body frame 3 that forms a framework of the saddle-type vehicle 1 and supports the engine 2 and various components. In the saddle-type vehicle 1, a steering shaft is rotatably supported to a head pipe 4 disposed at a front upper portion of the vehicle body frame 3; a front fork 6 and a handle 7 are supported to the steering shaft via a bracket 5. A front wheel 8 is rotatably supported at a lower end portion of the front fork 6.

A plurality of electric devices such as a headlight 16, a meter unit 17, and a pair of blinkers 18 are provided at a front upper portion of the saddle-type vehicle 1. The headlight 16 is disposed at a central front end side of the front upper portion of the saddle-type vehicle 1 in the left-right direction. The meter unit 17 is disposed at a rear upper side of the headlight 16. The pair of blinkers 18 is disposed on both left and right sides of a front portion of the saddle-type vehicle 1. The meter unit 17 includes, for example, a speedometer, a tachometer, an odometer, a fuel gauge, a blinker indicator, a gear position indicator, a high beam indicator, and various warning lights. The meter unit 17 in the present embodiment includes a liquid crystal display functioning as a speedometer, a tachometer, an odometer, a fuel gauge, a gear position indicator, and the like by displaying a traveling speed, an engine rotational speed, a traveling distance, an amount of remaining fuel, a gear position, and the like, as well as a plurality of lamps (for example, a plurality of light emitting diodes) functioning as a turn signal indicator, a high beam indicator, various warning lights, and the like. A specific configuration of the meter unit 17 is not limited thereto.

A vehicle body cover 11 is provided on the front upper portion of the saddle-type vehicle 1. The vehicle body cover 11 covers front, left, and right sides of the front upper portion of the saddle-type vehicle 1. The vehicle body cover 11 in the present embodiment covers only the front, left, and right sides of the front upper portion of the saddle-type vehicle 1 and does not cover left or right sides of a part thereof where the engine 2 is provided, or a lower side of the engine 2. Such a vehicle body cover may be referred to as a half cowl. As illustrated in FIG. 2, the vehicle body cover 11 includes a fixing portion 21 that fixes the vehicle body cover 11 to the head pipe 4 of the vehicle body frame 3. The vehicle body cover 11 further includes other fixing portions in addition to the fixing portion 21 so that the vehicle body cover 11 is fixed to the saddle-type vehicle 1 via these fixing portions. A visor 15 is attached to an upper portion of a central portion of the vehicle body cover 11 in the left-right direction.

Vehicle Body Cover

Figure 3:
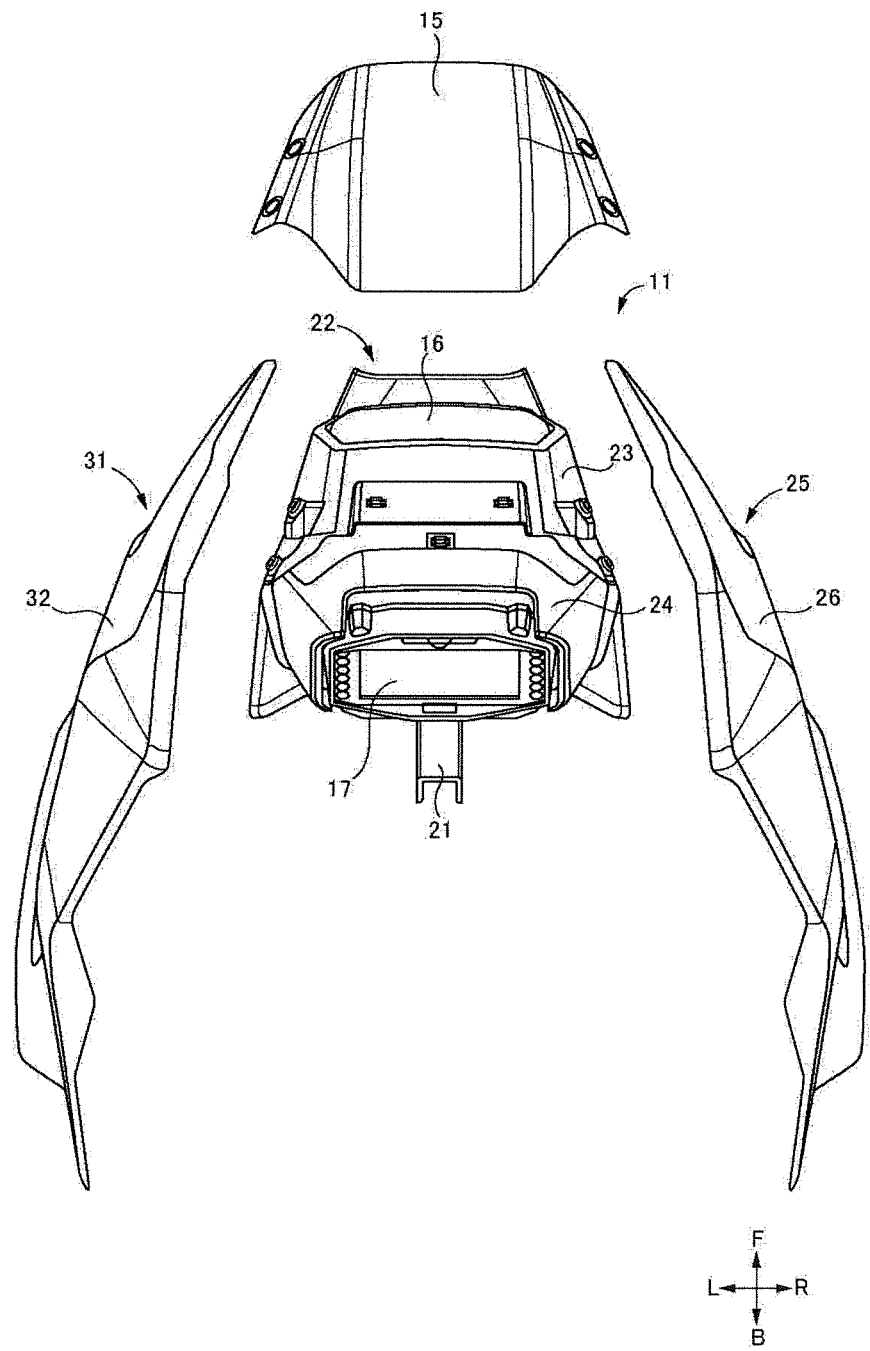
FIG. 3 illustrates a state in which a front cover, a left side cover, and a right side cover of the vehicle body cover according to the embodiment of the present disclosure are separated from each other.

FIG. 3 illustrates a state in which the visor 15 is detached from the vehicle body cover 11 and a front cover 22, a left side cover 31, and a right side cover 25 of the vehicle body cover 11 are separated from each other. As illustrated in FIG. 3, the vehicle body cover 11 includes the front cover 22, the right side cover 25, and the left side cover 31.

The front cover 22 covers the front side of the front upper portion of the saddle-type vehicle 1. As illustrated in FIG. 1 or 2, the front cover 22 is disposed in front of the handle 7 and the front fork 6 as well as above the front wheel 8, which is a central portion of the saddle-type vehicle 1 in the left-right direction. As illustrated in FIG. 3, the front cover 22 includes, at a front portion, a headlight cover 23 that covers upper, lower, left, and right sides of the headlight 16. The front cover 22 includes, at a rear portion, a meter cover 24 that covers mainly left and right sides of the meter unit 17. The front cover 22 further includes a front cover frame (not illustrated) that supports the headlight cover 23, the meter cover 24, and the like. The fixing portion 21 is fixed to a rear portion of the front cover frame. The visor 15 is attached to an upper portion of the front cover 22.

The right side cover 25 covers the right side of the front upper portion of the saddle-type vehicle 1. As illustrated in FIG. 1 or 2, the right side cover 25 is disposed below the handle 7 as well as to right of the front fork 6, which is a right portion of the saddle-type vehicle 1. The right side cover 25 is disposed upward of the front wheel 8 when the saddle-type vehicle 1 is viewed from right. The right side cover 25 extends in the front-rear direction. When the saddle-type vehicle 1 is viewed from right, a front end portion of the right side cover 25 is located forward of the front fork 6 and a rear end portion thereof is located rearward of the front fork 6 while reaching a position above the engine 2. The right side cover 25 is connected to a right portion of the front cover 22 by a fastener such as a screw or a rivet.

The left side cover 31 covers the left side of the front upper portion of the saddle-type vehicle 1. As illustrated in FIG. 2, the left side cover 31 is disposed at a left portion of the saddle-type vehicle 1 and is symmetrical with the right side cover 25. When the saddle-type vehicle 1 is viewed from left, a front end portion of the left side cover 31 is located forward of the front fork 6 and a rear end portion thereof is located rearward of the front fork 6 while reaching a position above the engine 2. The left side cover 31 is connected to a left portion of the front cover 22 by a fastener such as a screw or a rivet.

Right Side Cover

Figure 4:
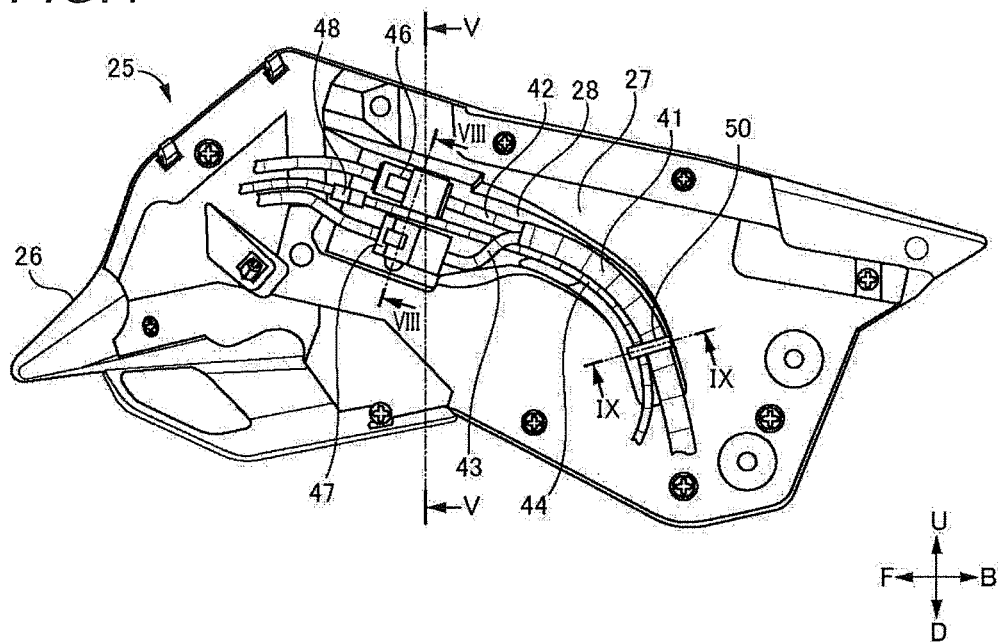
FIG. 4 is a left view of the right side cover of the vehicle body cover according to the embodiment of the present disclosure.
Figure 5:
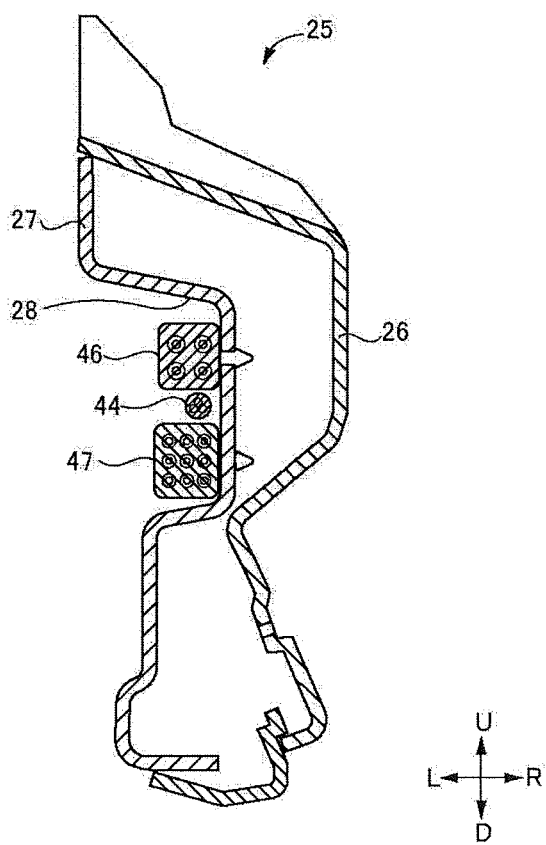
FIG. 5 is a cross-sectional view of the right side cover and the like as viewed from a direction of an arrow V-V in FIG. 4.
Figure 6:
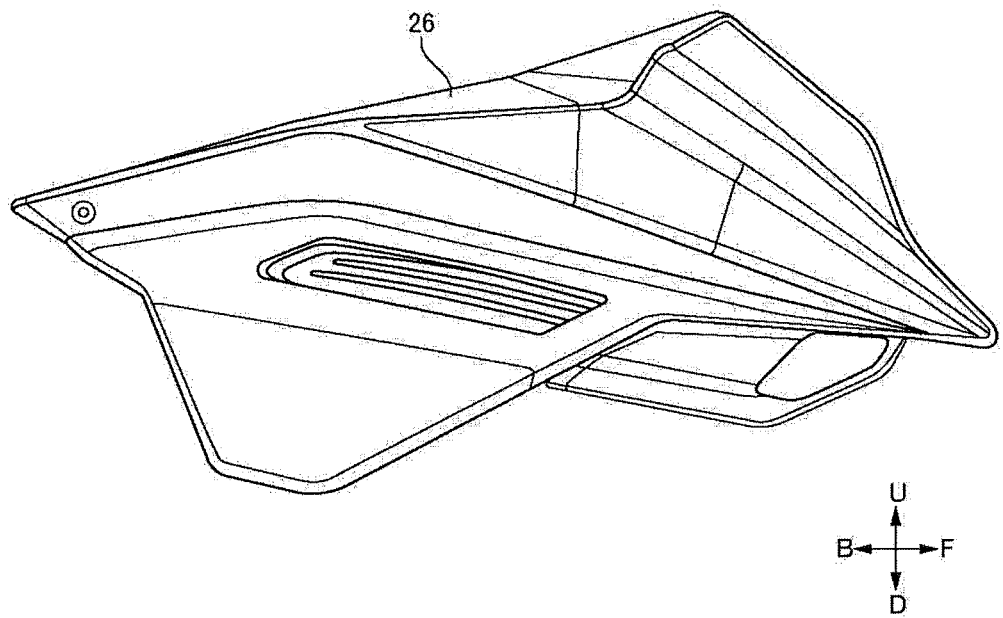
FIG. 6 illustrates an outer panel of the right side cover of the vehicle body cover according to the embodiment of the present disclosure.
Figure 7:
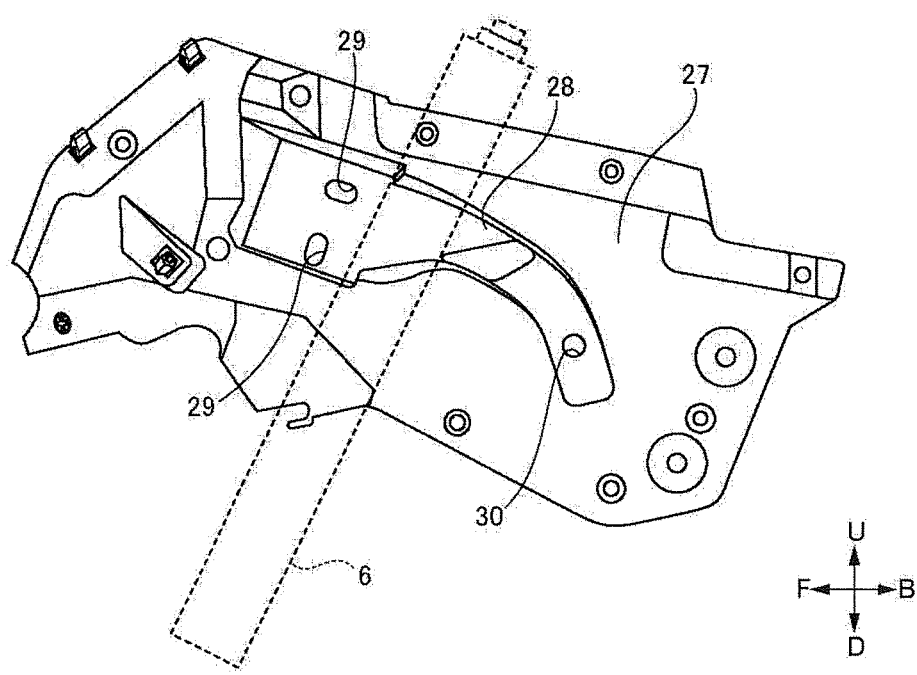
FIG. 7 illustrates an inner panel of the right side cover of the vehicle body cover according to the embodiment of the present disclosure.

FIG. 4 illustrates the right side cover 25 as viewed from left. FIG. 5 illustrates a cross section of the right side cover 25 and the like as viewed from a direction of an arrow V-V in FIG. 4. FIG. 6 illustrates a right surface of an outer panel 26 of the right side cover 25. FIG. 7 illustrates a left surface of an inner panel 27 of the right side cover 25.

As illustrated in FIGS. 4 and 5, the right side cover 25 includes the outer panel 26 and the inner panel 27. The outer panel 26 and the inner panel 27 are each formed of, for example, a resin.

The outer panel 26 forms a wall portion of the right side cover 25 on an outer side in the vehicle width direction, that is, a right wall portion. As illustrated in FIG. 6, the outer panel 26 includes locally curved parts in consideration of, for example, reducing air resistance during traveling, reducing traveling wind that hits a driver, improving an appearance of the saddle-type vehicle 1, or improving rigidity of the left side panel 25. When generally viewed, however, the outer panel 26 has a curved panel shape of extending in upper-lower and front-rear directions in which a central portion protrudes rightward (outer side in the vehicle width direction) relative to a peripheral portion thereof.

The inner panel 27 forms a wall portion of the right side cover 25 on an inner side in the vehicle width direction, that is, a left wall portion. The inner panel 27 includes a plurality of irregularities, which includes a harness insertion groove 28 to be described below, and locally curved parts in consideration of, for example, improving rigidity of the left side panel 25. When generally viewed, however, the inner panel 27 has a substantially flat plate shape.

The right side cover 25 is formed by overlapping the outer panel 26 and the inner panel 27 such that a left surface of the outer panel 26 and a right surface of the inner panel 27 face each other. The outer panel 26 and the inner panel 27 are coupled to each other by fixing peripheral portions thereof with a fastener such as a screw or a rivet. A space is defined between central portions of the outer panel 26 and the inner panel 27. In this manner, the right side cover 25 has a so-called hollow structure.

As illustrated in FIG. 4, the harness insertion groove 28, into which wire harnesses 41 to 44 including wires connected to electric devices are inserted and positioned, is provided on an inward surface of the right side cover 25 in the vehicle width direction, that is, a left surface. The electric devices mentioned herein are mainly the headlight 16, the meter unit 17, and the blinkers 18 provided at the front upper portion of the saddle-type vehicle 1.

As illustrated in FIG. 7, the harness insertion groove 28 is, on the inner panel 27 of the right side cover 25, opened inward in the vehicle width direction, that is, to the left. The harness insertion groove 28 is disposed substantially at a central portion of the inner panel 27 in the upper-lower direction and extends in the front-rear direction to pass through a substantially central portion in the front-rear direction. The harness insertion groove 28 intersects the front fork 6 when the saddle-type vehicle 1 is viewed from a side thereof. When the saddle-type vehicle 1 is viewed from a side thereof, a front end portion of the harness insertion groove 28 is located forward of the front fork 6; a rear end portion thereof is located rearward of the front fork 6; and a rear end side thereof extends rearward beyond the head pipe 4. The rear end side of the harness insertion groove 28 is curved downward.

As illustrated in FIG. 4, a plurality of wire harnesses 41 to 44 and a plurality of connectors 46 to 48 are inserted into the harness insertion groove 28. The wire harnesses 41 to 44 bundle a plurality of wires connected to the electric devices, respectively. Specifically, the wire harness 41 disposed at a rear portion of the right side cover 25 bundles a plurality of wires respectively connected to the headlight 16 and the meter unit 17. The plurality of wires contained in the wire harness 41 are divided into the wire harness 42 and the wire harness 43 at a front portion of the right side cover 25. The connector 46 is connected to an intermediate portion of the wire harness 42; the connector 47 is connected to an intermediate portion of the wire harness 43. The wire harness 44 bundles a plurality of wires that connect the meter unit 17 to the right blinker 18. The connector 48 is connected to an intermediate portion of a front portion of the wire harness 44. During maintenance of the saddle-type vehicle 1, the wire harnesses 41 to 44 can be detached from the saddle-type vehicle 1 by separating male and female sides of the connectors 46 to 48.

The width of the harness insertion groove 28 is set according to the number of wire harnesses including wires connected to the electric devices, outer diameters of the wire harnesses, sizes and the number of connectors connected to the wire harnesses, arrangements of the wire harnesses and the connectors, and the thickness of clamps that fix the wire harnesses and the like in the harness insertion groove 28. Specifically, as illustrated in FIG. 4, a front portion of the harness insertion groove 28 has a larger width than that of a rear portion thereof so that the connectors 46 and 47 and the wire harness 44 having a small diameter can be arranged side by side in the upper-lower direction. On the other hand, the rear portion of the harness insertion groove 28 has a smaller width than that of the front portion thereof so as to arrange the wire harness 41 having a large diameter and the wire harness 44 having a small diameter.

Figure 8:
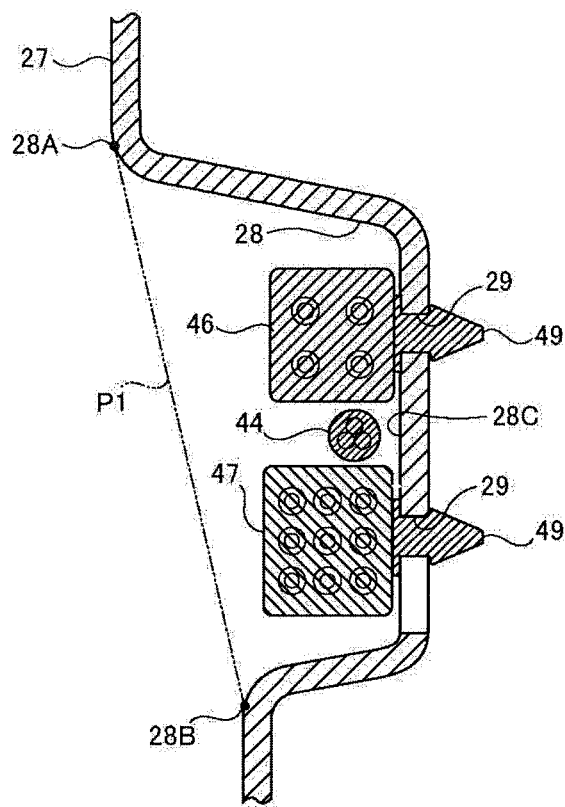
FIG. 8 is a cross-sectional view of the inner panel, a connector and the like as viewed from a direction of an arrow VIII-VIII in FIG. 4.

The depth of the harness insertion groove 28 is set according to the number of wire harnesses including wires connected to the electric devices, outer diameters of the wire harnesses, sizes and the number of connectors connected to the wire harnesses, arrangements of the wire harnesses and the connectors, and the thickness of clamps. FIG. 8 illustrates a cross section of the inner panel 27, the connectors 46 and 47, and the wire harness 44 as viewed from a direction of an arrow VIII-VIII in FIG. 4. As illustrated in FIG. 8, the depth of the front portion of the harness insertion groove 28 is set such that the wire harnesses 42 to 44 and the connectors 46 and 47 inserted therein are buried in the front portion of the harness insertion groove 28. The depth of the front portion of the harness insertion groove 28 refers to a distance between a plane P1 including an upper opening edge portion 28A and a lower opening edge portion 28B of the front portion of the harness insertion groove 28 and a bottom surface 28C of the front portion of the harness insertion groove 28.

Figure 9:
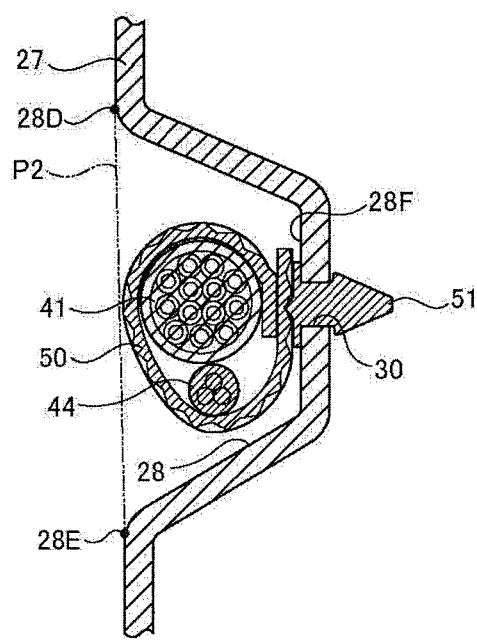
FIG. 9 is a cross-sectional view of the inner panel, a wire harness, and a clamp as viewed from a direction of an arrow IX-IX in FIG. 4.

FIG. 9 illustrates a cross section of the inner panel 27 and the wire harnesses 41 and 44 as viewed from a direction of an arrow IX-IX in FIG. 4. As illustrated in FIG. 9, the depth of the rear portion of the harness insertion groove 28 is set such that the wire harnesses 41 and 44 and a clamp 50 inserted therein are buried in the rear portion of the harness insertion groove 28. The depth of the rear portion of the harness insertion groove 28 refers to a distance between a plane P2 including an upper opening edge portion 28D and a lower opening edge portion 28E of the rear portion of the harness insertion groove 28 and a bottom surface 28F of the rear portion of the harness insertion groove 28.

As illustrated in FIG. 8, in the front portion of the harness insertion groove 28, the upper opening edge portion 28A is located inward of the lower opening edge portion 28B in the vehicle width direction, that is, to the left of the lower opening edge portion 28B. In the present embodiment, the bottom surface 28C of the front portion of the harness insertion groove 28 extends in a direction substantially perpendicular to a horizontal plane. A distance between the upper opening edge portion 28A and the bottom surface 28C of the front portion of the harness insertion groove 28 is longer than a distance between the lower opening edge portion 28B and the bottom surface 28C of the front portion of the harness insertion groove 28. In other words, an upper side wall of the front portion of the harness insertion groove 28 protrudes leftward of a lower side wall thereof.

As illustrated in FIG. 9, in the rear portion of the harness insertion groove 28, the upper opening edge portion 28D is located leftward of the lower opening edge portion 28E, and an upper side wall thereof protrudes leftward of a lower side wall. However, the extent to which the upper side wall protrudes leftward of the lower side wall of the rear portion of the harness insertion groove 28 is smaller than the extent to which the upper side wall protrudes leftward of the lower side wall of the front portion of the harness insertion groove 28.

As illustrated in FIG. 8, the connectors 46 and 47 are fixed to the bottom surface 28C of the front portion of the harness insertion groove 28 by a fastener 49 such as a push rivet. Specifically, the bottom surface 28C of the front portion of the harness insertion groove 28 is formed with two attachment holes 29; tip end portions of two fasteners 49 connected to the connectors 46 and 47 are inserted and locked into the two attachment holes 29, respectively.

As illustrated in FIG. 9, the wire harnesses 41 and 44 are fixed to the bottom surface 28F of the rear portion of the harness insertion groove 28 by a clamp 50 and a fastener 51 such as a push rivet. Specifically, the wire harnesses 43 and 44 are bundled by the clamp 50. The fastener 51 is coupled to or integral with the clamp 50 and a tip end portion of the fastener 51 is inserted and locked into an attachment hole 30 formed in the bottom surface 28F of the rear portion of the harness insertion groove 28.

Left Side Cover

Figure 10:
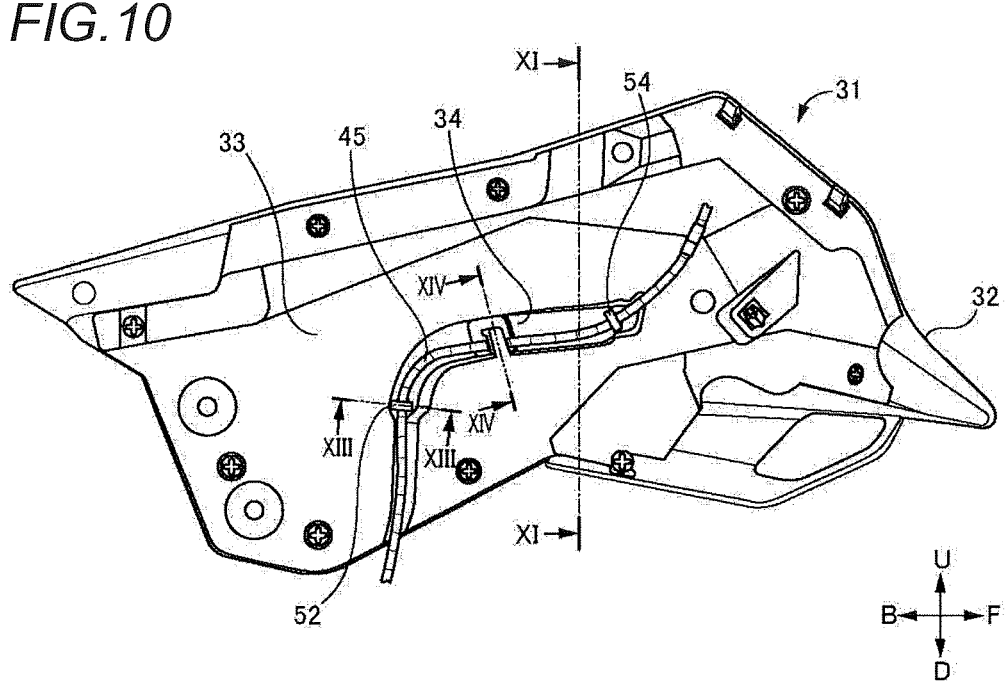
FIG. 10 is a right view of the left side cover of the vehicle body cover according to the embodiment of the present disclosure.
Figure 11:
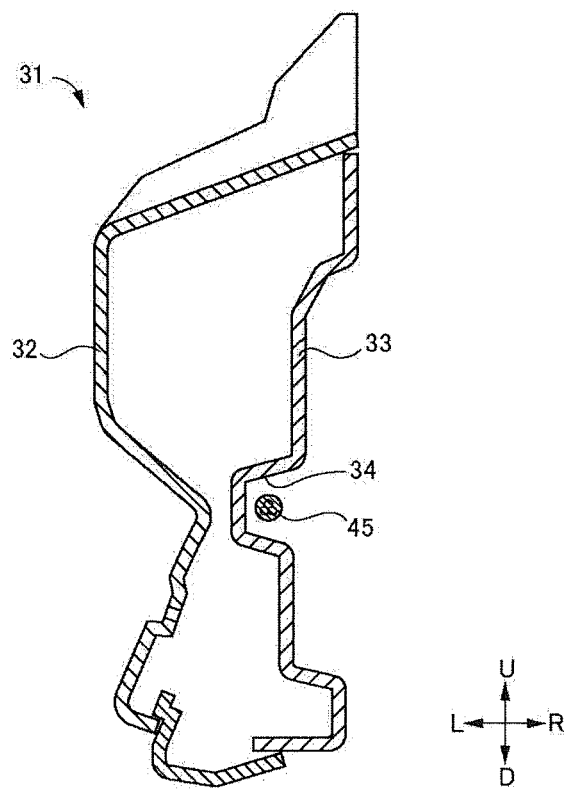
FIG. 11 is a cross-sectional view of the left side cover and the like as viewed from a direction of an arrow XI-XI in FIG. 10.
Figure 12:
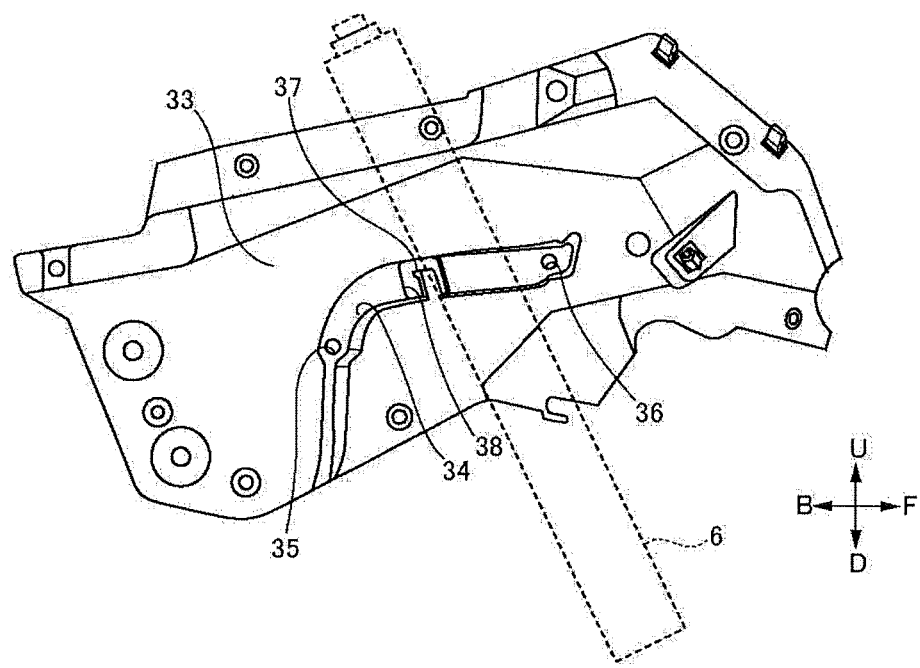
FIG. 12 illustrates an inner panel of the left side cover of the vehicle body cover according to the embodiment of the present disclosure.

FIG. 10 illustrates the left side cover 31 as viewed from right. FIG. 11 illustrates a cross section of the left side cover 31 and the like as viewed from a direction of an arrow XI-XI in FIG. 10. FIG. 12 illustrates a right surface of an inner panel 33 of the left side cover 31.

As illustrated in FIGS. 10 and 11, the left side cover 31 includes an outer panel 32 and the inner panel 33. The outer panel 32 forms a wall portion of the left side cover 31 on an outer side in the vehicle width direction, that is, a left wall portion. The outer panel 32 is formed of the same material as the outer panel 26 of the right side cover 25 and has a bilaterally symmetric shape therewith. The inner panel 33 forms a wall portion of the left side cover 31 on an inner side in the vehicle width direction, that is, a right wall portion. The inner panel 33 includes a plurality of irregularities, which includes a harness insertion groove 34 to be described below, and locally curved parts in consideration of, for example, improving rigidity of the right side panel 31. When generally viewed, however, the inner panel 33 has a substantially flat plate shape.

The left side cover 31 is, similarly to the right side cover 25, formed by overlapping the outer panel 32 and the inner panel 33 such that a right surface of the outer panel 32 and a left surface of the inner panel 33 face each other. Peripheral portions of the outer panel 32 and the inner panel 33 are fixed with a fastener such as a screw or a rivet. The left side cover 31 has a hollow structure in which a space is defined between central portions of the outer panel 32 and the inner panel 33.

The harness insertion groove 34, into which a wire harness 45 including wires connected to an electric device such as the meter unit 17 is inserted and positioned, is provided on an inward surface of the left side cover 31 in the vehicle width direction, that is, a right surface. As illustrated in FIG. 12, the harness insertion groove 34 is, on the inner panel 33 of the left side cover 31, opened inward in the vehicle width direction, that is, to the right. The harness insertion groove 34 is formed in a region from the central portion to a lower portion of the inner panel 33. A front portion of the harness insertion groove 34 extends in the front-rear direction and a rear portion thereof is curved downward. The harness insertion groove 34 intersects the front fork 6 when the saddle-type vehicle 1 is viewed from a side thereof.

As illustrated in FIG. 10, the wire harness 45 including wires connected to an electric device is inserted into the harness insertion groove 34. The wire harness 45 bundles a plurality of wires that connect the meter unit 17 to the left blinker 18. The width of the harness insertion groove 34 is set in accordance with an outer diameter of the wire harness 45 and the thickness of clamps 52 and 54 that fix the wire harness 45 in the harness insertion groove 34.

Figure 13:
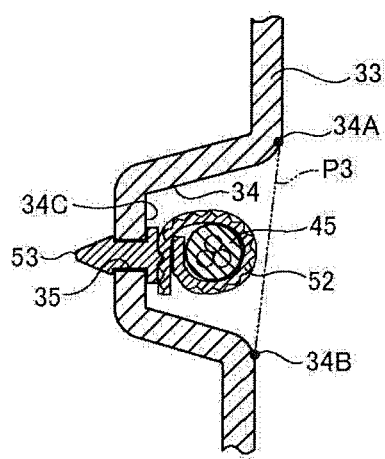
FIG. 13 is a cross-sectional view of the inner panel, a wire harness, and a clamp as viewed from a direction of an arrow XIII-XIII in FIG. 10.

The depth of the harness insertion groove 34 is set in accordance with the outer diameter of the wire harness 45 and the thickness of the clamps 52 and 54. FIG. 13 illustrates a cross section of the inner panel 33 and the wire harness 45 as viewed from a direction of an arrow XIII-XIII in FIG. 10. As illustrated in FIG. 13, the depth of the rear portion of the harness insertion groove 34 is set such that the wire harness 45 and the clamp 52 inserted therein are buried in the harness insertion groove 34. The depth of the rear portion of the harness insertion groove 34 refers to a distance between a plane P3 including an upper opening edge portion 34A and a lower opening edge portion 34B of the rear portion of the harness insertion groove 34 and a bottom surface 34C of the rear portion of the harness insertion groove 34.

As illustrated in FIG. 13, in the rear portion of the harness insertion groove 34, the upper opening edge portion 34A is located inward of the lower opening edge portion 34B in the vehicle width direction, that is, to the right of the lower opening edge portion 34B. In the present embodiment, the bottom surface 34C of the rear portion of the harness insertion groove 34 extends in a direction substantially perpendicular to the horizontal plane. A distance between the upper opening edge portion 34A and the bottom surface 34C of the rear portion of the harness insertion groove 34 is longer than a distance between the lower opening edge portion 34B and the bottom surface 34C of the rear portion of the harness insertion groove 34. In other words, an upper side wall of the rear portion of the harness insertion groove 34 protrudes rightward of a lower side wall.

Further, as illustrated in FIG. 13, a rear end part of the wire harness 45 is fixed to the bottom surface 34C of the rear portion of the harness insertion groove 34 by the clamp 52 and the fastener 53 such as a push rivet. Specifically, the rear end part of the wire harness 45 is surrounded by the clamp 52; a tip end portion of the fastener 53 that is coupled to or integral with the clamp 52 is inserted and locked in an attachment hole 35 formed in the bottom surface 34C of the rear portion of the harness insertion groove 34. Similarly, as illustrated in FIG. 10, a front end part of the wire harness 45 is also fixed to a bottom surface of the front portion of the harness insertion groove 34 by inserting and locking a tip end portion of a fastener that is coupled to or integral with the clamp 54 in an attachment hole 36 formed in the bottom surface of the front portion of the harness insertion groove 34.

Figure 14:
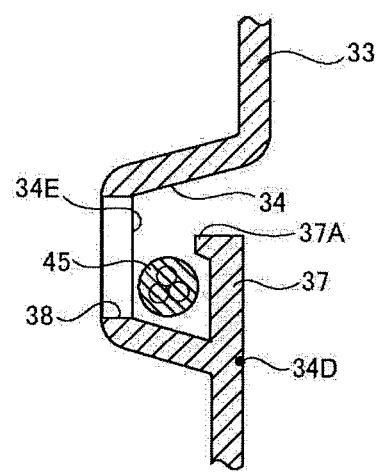
FIG. 14 is a cross-sectional view of the inner panel, the wire harness, and a fastener as viewed from a direction of an arrow XIV-XIV in FIG. 10.

FIG. 14 illustrates a cross section of the inner panel 33 and the wire harness 45 as viewed from a direction of an arrow XIV-XIV in FIG. 10. As illustrated in FIG. 14, the inner panel 33 is formed with a stopper 37 that fastens the wire harness 45 inserted into the harness insertion groove 34 therein. The stopper 37 is disposed at a substantially central portion of the harness insertion groove 34 in the front-rear direction and protrudes upward from a lower opening edge portion 34D of the harness insertion groove 34. The stopper 37 has a columnar shape or a plate shape extending in the upper-lower direction. The stopper 37 is integral with the inner panel 33 by resin molding, for example. A left surface of the stopper 37 is separated from a bottom surface 34E of the harness insertion groove 34 so that the wire harness 45 can be accommodated in the harness insertion groove 34. An upper end of the stopper 37 and an upper side wall surface of the harness insertion groove 34 define a gap so that the wire harness 45 can be enter the harness insertion groove 34. The upper end of the stopper 37 includes a protruding portion 37A slightly protruding leftward. The protruding portion 37A has a function of preventing the wire harness 45 accommodated in the harness insertion groove 34 from coming out due to vibration, traveling wind, and the like.

As illustrated in FIG. 12 or 14, a through hole 38 is formed in a part of the inner panel 33 that faces the stopper 37, specifically, a part at the bottom of the harness insertion groove 34 that faces the stopper 37. Accordingly, the inner panel 33 in which the harness insertion groove 34 and the stopper 37 are integrally formed can be easily formed in a two-divided mold.

As described above, the vehicle body cover 11 according to the embodiment of the present disclosure includes harness insertion grooves 28 and 34 on respective inward surfaces of the right side cover 25 and the left side cover 31 in the vehicle width direction. By inserting the wire harnesses 41 to 44 and the connectors 46 to 48 into the harness insertion groove 28 and inserting the wire harness 45 into the harness insertion groove 34, the wire harnesses 41 to 45 and the connectors 46 to 48 can be covered and hidden by the vehicle body cover 11 and be invisible from a side (right or left) of the saddle-type vehicle 1. Accordingly, the wire harnesses 41 to 45 and the connectors 46 to 48 can be hidden from a person around the saddle-type vehicle 1 and the appearance of the saddle-type vehicle 1 can be improved.

By inserting the wire harnesses 41 to 44 and the connectors 46 to 48 into the harness insertion groove 28 and inserting the wire harness 45 into the harness insertion groove 34, a part or all of the wire harnesses 41 to 45 and the connectors 46 to 48 can be invisible from above the saddle-type vehicle 1. Accordingly, the wire harnesses 41 to 45 and the connectors 46 to 48 can be hidden from the driver seated on the seat of the saddle-type vehicle 1 and the appearance of the saddle-type vehicle 1 can be improved.

Particularly, the depth of the harness insertion groove 28 is set such that the wire harnesses 41 to 44 and the connectors 46, 47 inserted therein can be buried in the harness insertion groove 28; the depth of the harness insertion groove 34 is set such that the wire harness 45 inserted therein can be buried in the harness insertion groove 34. Accordingly, all or most of the wire harnesses 41 to 45 and the connectors 46 and 47 can be invisible from above the saddle-type vehicle 1 and be hidden from the driver. Therefore, the aesthetic appearance of the saddle-type vehicle 1 from the driver can be improved.

Further, in the harness insertion groove 28, the upper opening edge portions 28A and 28D are located inward of the lower opening edge portions 28B and 28E in the vehicle width direction. In the harness insertion groove 34, the upper opening edge portion 34A is located inward of the lower opening edge portion 34B in the vehicle width direction. Accordingly, upper side walls of the harness insertion grooves 28 and 34 become eaves and the wire harnesses 41 to 45 and the connectors 46 to 48 can be hardly seen from the driver. All or a part of the wire harnesses 41 to 45 and the connectors 46 to 48 can be invisible from the driver even when, for example, the saddle-type vehicle 1 turns or inclines to the left or the right relative to the driver, or eyes of the driver are obliquely directed to the front portion of the saddle-type vehicle 1.

The harness insertion groove 28 is opened inward in the vehicle width direction on the inner panel 27. Therefore, the wire harnesses 41 to 44 and the like can be inserted into the harness insertion groove 28 by being inserted between the head pipe 4 or the front fork 6 and the right side cover 25 during manufacture of the saddle-type vehicle 1. Further, the wire harnesses 41 to 44 can be detached from the harness insertion groove 28 by inserting a hand between the head pipe 4 or the front fork 6 and the right side cover 25 during maintenance of the saddle-type vehicle 1. Similarly, the harness insertion groove 34 is opened inward in the vehicle width direction on the inner panel 33. Therefore, the wire harness 45 can be inserted into the harness insertion groove 34 by being inserted between the head pipe 4 or the front fork 6 and the left side cover 31 during manufacture of the saddle-type vehicle 1. Further, the wire harness 45 can be detached from the harness insertion groove 34 by inserting a hand between the head pipe 4 or the front fork 6 and the left side cover 31 during maintenance of the saddle-type vehicle 1. In this manner, the wire harnesses 41 to 45 can be easily attached to and detached from the saddle-type vehicle 1 without detaching the vehicle body cover 11 from the saddle-type vehicle 1 or disassembling the vehicle body cover 11. Accordingly, workability during manufacture or maintenance of the saddle-type vehicle 1 can be improved.

In addition, during manufacture or maintenance of the saddle-type vehicle 1, the wire harnesses 41 to 45 can be guided to the electric devices provided on the vehicle body cover 11 in an orderly manner by simply inserting the wire harnesses 41 to 45 into the harness insertion grooves 28 and 34. Therefore, the wire harnesses can be assembled easily and quickly.

The harness insertion grooves 28 and 34 extend in the front-rear direction and intersect the front fork 6 when the saddle-type vehicle 1 is viewed from a side thereof. Accordingly, a routing path of the wire harnesses 41 to 45 extending forward through the right or the left of the front fork 6 can be formed easily. When the wire harnesses 41 to 45 are routed in such a path, the wire harnesses 41 to 45 and the connectors 46 to 48 can be prevented from coming into contact with the front fork 6. Particularly, the front fork 6 of the saddle-type vehicle 1 in the present embodiment rotates relative to the vehicle body cover 11 when the vehicle turns. Accordingly, the wire harnesses 41 to 45 or the connectors 46 to 48 may be damaged by collisions or friction with the front fork 6 when coming into contact with the front fork 6. However, this can be prevented according to the vehicle body cover 11 in the present embodiment.

The inner panel 27, on which the harness insertion groove 28 is formed, is formed with the attachment hole 30 for attachment of the clamp 50 that fastens the wire harnesses 41 and 44 inserted into the harness insertion groove 28 therein. Accordingly, the wire harnesses 41 and 44 can be easily fixed into the harness insertion groove 28 by using the clamp 50. When the fastener 51 that is coupled to or integral with the clamp 50 is inserted into the attachment hole 30, the tip end portion of the fastener 51 that penetrates the attachment hole 30 is disposed between the inner panel 27 and the outer panel 26 and is invisible from outside. Therefore, the wire harnesses 41 and 44 can be fixed without sacrificing the appearance of the saddle-type vehicle 1. Similarly, the inner panel 33, on which the harness insertion groove 34 is formed, is formed with attachment holes 35 and 36 for attachment of the clamps 52 and 54 that fasten the wire harness 45 inserted into the harness insertion groove 34 therein. Accordingly, the wire harness 45 can be easily fixed into the harness insertion groove 34 by using the clamps 52 and 54. When the fastener 53 and the like that is respectively coupled to or integral with the clamps 52 and 54 is inserted into the attachment holes 35 and 36, the tip end portion of the fastener 53 that penetrates the attachment hole 35 and a tip end portion of a fastener that penetrates the attachment hole 36 are disposed between the inner panel 33 and the outer panel 32 and are invisible from outside. Therefore, the wire harness 45 can be fixed without sacrificing the appearance of the saddle-type vehicle 1.

Further, the inner panel 27, on which the harness insertion groove 28 is formed, is formed with the attachment hole 29 for attachment of the clamp 49 that fastens the connectors 46 and 47 inserted into the harness insertion groove 28 therein. Accordingly, the connectors 46 and 47 can be easily fixed into the harness insertion groove 28 by using the fastener 49. When the fastener 49 is inserted into the attachment hole 29, the distal end portion of the fastener 49 that penetrates the attachment hole 29 is disposed between the inner panel 27 and the outer panel 26 and is invisible from outside. Accordingly, the connectors 46 and 47 can be fixed without sacrificing the appearance of the saddle-type vehicle 1.

The inner panel 33 of the left side cover 31 includes the stopper 37 that fastens the wire harness 45 inserted into the harness insertion groove 34 therein. The wire harness 45 can be easily fastened in the harness insertion groove 34 by the stopper 37.

In the present embodiment, the wire harnesses 41 to 43 including wires respectively connected to the headlight 16 and the meter unit 17 are collectively disposed in the harness insertion groove 28 provided on the right side cover 25. The wire harness 44 including only wires that connect the meter unit 17 to the right blinker 18 is also disposed in the harness insertion groove 28. On the other hand, only the wire harness 45 including only wires that connect the meter unit 17 to the left blinker 18 is disposed in the harness insertion groove 34 provided on the left side cover 31. Accordingly, wires connected to the headlight 16 and the meter unit 17, wires that connect the meter unit 17 to the right blinker 18, and wires that connect the meter unit 17 to the left blinker 18 can be arranged in an orderly manner. Specifically, locations where wires intersect each other can be reduced and the wires can be prevented from being scattered. Therefore, the appearance of the saddle-type vehicle 1 and workability during manufacture and maintenance of the saddle-type vehicle 1 can be improved.

The shape, width, or depth of a harness insertion groove is not limited to those of the harness insertion grooves 28 and 34 described in the embodiment. The inner panel 27 or 33 may include a plurality of harness insertion grooves. The harness insertion groove may be formed on only one of the right side cover 25 and the left side cover 31. Further, the type, the outer diameter, the number, and the arrangement of a wire harness inserted into the harness insertion groove, as well as the type, the size, the number, and the arrangement of a connector is not limited to those described in the embodiment. The connector may not be disposed to the harness insertion groove. Wires contained in the wire harness inserted into the harness insertion groove may include wires that connect devices other than the electric devices provided at the front upper portion of the saddle-type vehicle.

The wire harness or the connector inserted into the harness insertion groove may not be buried in the harness insertion groove at all locations thereof. That is, the wire harness or the connector inserted into the harness insertion groove may partially come out of the harness insertion groove from a part thereof.

The vehicle body cover is not limited to the half cowl, and may be a full cowl. While the above embodiment describes a motorcycle in which the vehicle body cover 11 is fixed to the vehicle body frame 3 and the front fork 6 rotates relative to the vehicle body cover 11, the present disclosure is not limited thereto. The present disclosure can also be applied to a motorcycle of such a type that the vehicle body cover is fixed to the upper portion of the front fork together with the headlight and the meter unit and the vehicle body cover, the headlight, and the meter unit move with rotation of the front fork. The present disclosure can also be applied to various saddle-type vehicles such as scooters and buggy vehicles.

The present disclosure can be modified as appropriate without departing from the scope or spirit of the disclosure which can be read from the claims and the entire specification; a vehicle body cover and a saddle-type vehicle with such modifications are also contained in the technical idea of the present disclosure.

What is claimed is:

1. A vehicle body cover that covers front, left, and right sides of a front upper portion of a saddle-type vehicle, the vehicle body cover comprising:
   a front cover that covers the front side of the front upper portion of the saddle-type vehicle; and
   a pair of side covers that respectively cover the left side and the right side of the front upper portion of the saddle-type vehicle,
   wherein an inward surface of at least one of the pair of side covers in a vehicle width direction is provided with a harness insertion groove for inserting therein and positioning a wire harness including wires connected to an electric device including a meter unit provided at the front upper portion of the saddle-type vehicle, and
   wherein the harness insertion groove is opened inward in the vehicle width direction on the at least one of the pair of side covers and has a shape formed by extending outward a portion of the inward surface having a substantially flat plate shape.

2. The vehicle body cover according to claim 1, wherein the at least one of the pair of side covers includes: an outer panel that forms a wall portion at an outer side in the vehicle width direction; and an inner panel that forms a wall portion at an inner side in the vehicle width direction, and the harness insertion groove is opened inward in the vehicle width direction on the inner panel.

3. The vehicle body cover according to claim 1, wherein a depth of the harness insertion groove is set such that the wire harness inserted into the harness insertion groove is buried in the harness insertion groove.

4. The vehicle body cover according to claim 1, wherein a depth of the harness insertion groove is set such that a connector provided in the wire harness and inserted into the harness insertion groove is buried in the harness insertion groove.

5. The vehicle body cover according to claim 1, wherein an upper opening edge portion of the harness insertion groove is located inward of a lower opening edge portion of the harness insertion groove in the vehicle width direction.

6. The vehicle body cover according to claim 1, wherein the harness insertion groove extends in a front-rear direction and intersects with a front fork when the saddle-type vehicle is viewed from a side thereof.

7. The vehicle body cover according to claim 2, wherein the inner panel on which the harness insertion groove is formed is formed with an attachment hole for attachment of a clamp that fastens the wire harness inserted in the harness insertion groove to the harness insertion groove.

8. The vehicle body cover according to claim 2, wherein the inner panel on which the harness insertion groove is formed is integrally formed with a stopper that fastens the wire harness inserted in the harness insertion groove to the harness insertion groove.

9. A saddle-type vehicle comprising:
   a vehicle body cover that covers front, left, and right sides of a front upper portion of the saddle-type vehicle;
   an electric device including a meter unit provided at the front upper portion of the saddle-type vehicle; and
   a wire harness including wires connected to the electric device,
   wherein the vehicle body cover includes: a front cover that covers the front side of the front upper portion of the saddle-type vehicle; and a pair of side covers that respectively cover the left side and the right side of the front upper portion of the saddle-type vehicle, wherein an inward surface of at least one of the pair of side covers in a vehicle width direction is provided with a harness insertion groove,
   wherein the wire harness is inserted and positioned in the harness insertion groove, and
   wherein the harness insertion groove is opened inward in the vehicle width direction on the at least one of the pair of side covers and has a shape formed by extending outward a portion of the inward surface having a substantially flat plate shape.

10. The vehicle body cover according to claim 1, wherein the harness insertion groove is disposed substantially at a central portion of the at least one of the pair of side covers in an upper-lower direction and extends in a front-rear direction to pass through a substantially central portion of the at least one of the pair of side covers in the front-rear direction.

11. The vehicle body cover according to claim 1, wherein a one of the pair of side covers is located a one side of a front fork and extends in a front-rear direction when the saddle-type vehicle is viewed from the one side of the front fork, the one of the pair of side covers having a front end portion located forward of the front fork and a rear end portion located rearward of the front fork when the saddle-type vehicle is viewed from the one side of the front fork.

12. The vehicle body cover according to claim 11, wherein when the saddle-type vehicle is viewed from a side thereof, the harness insertion groove has a front end portion located forward of the front fork, has a rear end portion located rearward of the front fork and intersects with the front fork.

13. The vehicle body cover according to claim 12, wherein a rear end side of the harness insertion groove extends rearward beyond a head pipe.

* * * * *